United States Patent
Taheri et al.

(10) Patent No.: US 12,511,478 B2
(45) Date of Patent: Dec. 30, 2025

(54) ARTIFICIAL INTELLIGENCE BASED LOG MASK PREDICTION FOR COMMUNICATIONS SYSTEM TESTING

(71) Applicant: VIAVI Solutions Inc., Chandler, AZ (US)

(72) Inventors: Sayed Taheri, Cheshire (GB); Faris Muhammad, Edgware (GB); Hamed Al-Raweshidy, New Denham (GB)

(73) Assignee: VIAVI Solutions Inc., Chandler, AZ (US)

( * ) Notice: Subject to any disclaimer, the term of this patent is extended or adjusted under 35 U.S.C. 154(b) by 299 days.

(21) Appl. No.: 18/301,105

(22) Filed: Apr. 14, 2023

(65) Prior Publication Data

US 2024/0346247 A1  Oct. 17, 2024

(51) Int. Cl.
*G06F 40/284* (2020.01)
*G06F 40/205* (2020.01)
*G06F 40/242* (2020.01)
*G06N 3/044* (2023.01)
*G06N 3/08* (2023.01)

(52) U.S. Cl.
CPC .......... *G06F 40/284* (2020.01); *G06F 40/205* (2020.01); *G06F 40/242* (2020.01); *G06N 3/044* (2023.01); *G06N 3/08* (2013.01)

(58) Field of Classification Search
CPC .... G06F 40/284; G06F 40/205; G06F 40/242; G06F 11/3476; G06F 11/3684; G06F 11/3692; G06F 21/6254; G06N 3/044; G06N 3/08; G06N 3/045; G06N 3/084
See application file for complete search history.

(56) References Cited

U.S. PATENT DOCUMENTS

| | | | |
|---|---|---|---|
| 2019/0251291 A1* | 8/2019 | Margalit | G06F 18/2193 |
| 2021/0279577 A1 | 9/2021 | West et al. | |
| 2023/0145258 A1* | 5/2023 | Jessen | G16H 50/20 706/12 |
| 2024/0281347 A1* | 8/2024 | Jhanwar | G06F 13/4221 |
| 2024/0364444 A1* | 10/2024 | Niu | H04L 1/0003 |

FOREIGN PATENT DOCUMENTS

WO  2022269562 A1  12/2022

OTHER PUBLICATIONS

Ma et al, Automatic Parsing and Utilization of System Log Features in Log Analysis: a Survey, Applied Sciences, Apr. 14, 2023 (Year: 2023).*

(Continued)

*Primary Examiner* — Linda Wong
(74) *Attorney, Agent, or Firm* — Harrity & Harrity, LLP

(57) ABSTRACT

In some implementations, a device may receive training data associated with a set of training command logs and a set of training log masks. The device may generate at least one artificial intelligence model for communications system testing. The device may receive a command log, the command log associated with a first log mask. The device may execute the at least one artificial intelligence model to identify a second log mask for a second set of tests. The device may output information associated with the second log mask for the second set of tests.

20 Claims, 9 Drawing Sheets

(56) References Cited

OTHER PUBLICATIONS

Taheri et al, Domain Tailored Large Language Models for Log Mask Prediction in Cellular Network Diagnostics, IEEE Transactions on Network and Service Management, Feb. 17, 2025 (Year: 2025).*

Tao et al, Biglog: Unsupervised Large Scale Pre-training for a unified Log Representation, 2023 IEEE/ACM 31st International Symposium on Quality of Service, Jun. 19-21, 2023 (Year: 2023).*

Huu et al, Research on Log Analysis Techniques to detect network attacks, SOICT 2023, Dec. 7-8, 2023 (Year: 2023).*

Extended European Search Report for European Application No. 24169411.6 dated Jun. 13, 2025, 10 pages.

Li, X., et al., "SwissLog: Robust and Unified Deep Learning Based Log Anomaly Detection for Diverse Faults," IEEE 31st International Symposium on Software Reliability Engineering (ISSRE), 2020, pp. 92-103.

* cited by examiner

ARTIFICIAL INTELLIGENCE BASED LOG MASK PREDICTION FOR COMMUNICATIONS SYSTEM TESTING

BACKGROUND

Artificial intelligence includes a broad range of technologies and approaches that enable machines to mimic human intelligence and cognitive processes. Examples of artificial intelligence techniques include machine learning, rule-based systems, expert systems, and neural networks, among other examples. Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

Artificial neural networks, sometime referred to as neural networks (NNs), are computing systems inspired by the biological neural networks associated with a biological brain. An NN is based on a collection of connected units or nodes called artificial neurons, which loosely model the neurons in a biological brain. Each connection, similar to the synapses in a biological brain, can support a transmission of a signal to other neurons. An artificial neuron may receive a signal, processes the signal, and/or transmit the signal to other neurons. The "signal" at a connection is a real number, and the output of each neuron is computed by some non-linear function of the sum of its inputs. The connections may be referred to as edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals may travel from the first layer (the input layer) to the last layer (the output layer) (e.g., possibly after traversing the layers multiple times).

Two examples of neural networks are recurrent neural networks (RNNs) and deep neural networks (DNNs), among other examples. RNNs are a type of neural network that enable processing of sequential data, such as time series data or language data (e.g., natural language data, such as human-generated text, or computer-language data, such as program code). RNNs include feedback connections to cause information to persist over time, thereby allowing modeling of complex temporary relationships. DNNs are a type of neural network that have multiple layers for processing complex, high-dimensional data. A DNN may include an RNN as a layer, of the multiple layers, to enable the DNN to process sequential data.

SUMMARY

Some implementations described herein relate to a device. The device may include one or more memories and one or more processors coupled to the one or more memories. The one or more processors may be configured to receive training data associated with a set of training command logs and a set of training log masks. The one or more processors may be configured to generate, based on the training command logs and the set of training log masks, at least one artificial intelligence model for communications system testing. The one or more processors may be configured to receive a command log, the command log representing a first set of results of a first set of tests performed on a communications system in connection with a first log mask, wherein the command log includes at least one of an indication of the first log mask, a set of errors, or a set of warnings. The one or more processors may be configured to execute the at least one artificial intelligence model to identify a second log mask for a second set of tests, the at least one artificial intelligence model including a first artificial intelligence model associated with generating the second log mask based on the first log mask and the command log, and the at least one artificial intelligence model including a second artificial intelligence model associated with generating the second log mask based on triage data logged in a ticketing system. The one or more processors may be configured to output information associated with the second log mask for the second set of tests.

Some implementations described herein relate to a method. The method may include receiving, by a device, a command log, the command log representing a first set of results of a first set of tests performed on a communications system in connection with a first log mask, wherein the command log includes at least one of an indication of the first log mask, a set of errors, or a set of warnings. The method may include executing, by the device, a plurality of artificial intelligence models to identify a second log mask for a second set of tests, the plurality of artificial intelligence models including a first artificial intelligence model associated with generating the second log mask based on the first log mask and the command log, and the plurality of artificial intelligence models including a second artificial intelligence model associated with generating the second log mask based on triage data logged in a ticketing system. The method may include outputting, by the device, information associated with the second log mask for the second set of tests.

Some implementations described herein relate to a non-transitory computer-readable medium that stores a set of instructions. The set of instructions, when executed by one or more processors of a device, may cause the device to receive a first command log, the first command log representing a first set of results of a first set of tests performed on a communications system in connection with a first log mask, wherein the first command log includes at least one of an indication of the first log mask, a set of errors, or a set of warnings. The set of instructions, when executed by one or more processors of the device, may cause the device to execute the at least one artificial intelligence model to identify a second log mask for a second set of tests, the at least one artificial intelligence model including a first artificial intelligence model associated with generating the second log mask based on the first log mask and the first command log, and the at least one artificial intelligence model including a second artificial intelligence model associated with generating the second log mask based on triage data logged in a ticketing system. The set of instructions, when executed by one or more processors of the device, may cause the device to output information associated with the second log mask for the second set of tests. The set of instructions, when executed by one or more processors of the device, may cause the device to receive, based on outputting the information associated with the second log mask, a second command log, the second command log representing a second set of results of the second set of tests performed on the communications system in connection with the second log mask. The set of instructions, when executed by one or more processors of the device, may cause the device to evaluate the second command log to determine whether to generate a third log mask.

DETAILED DESCRIPTION

Figure 1A:
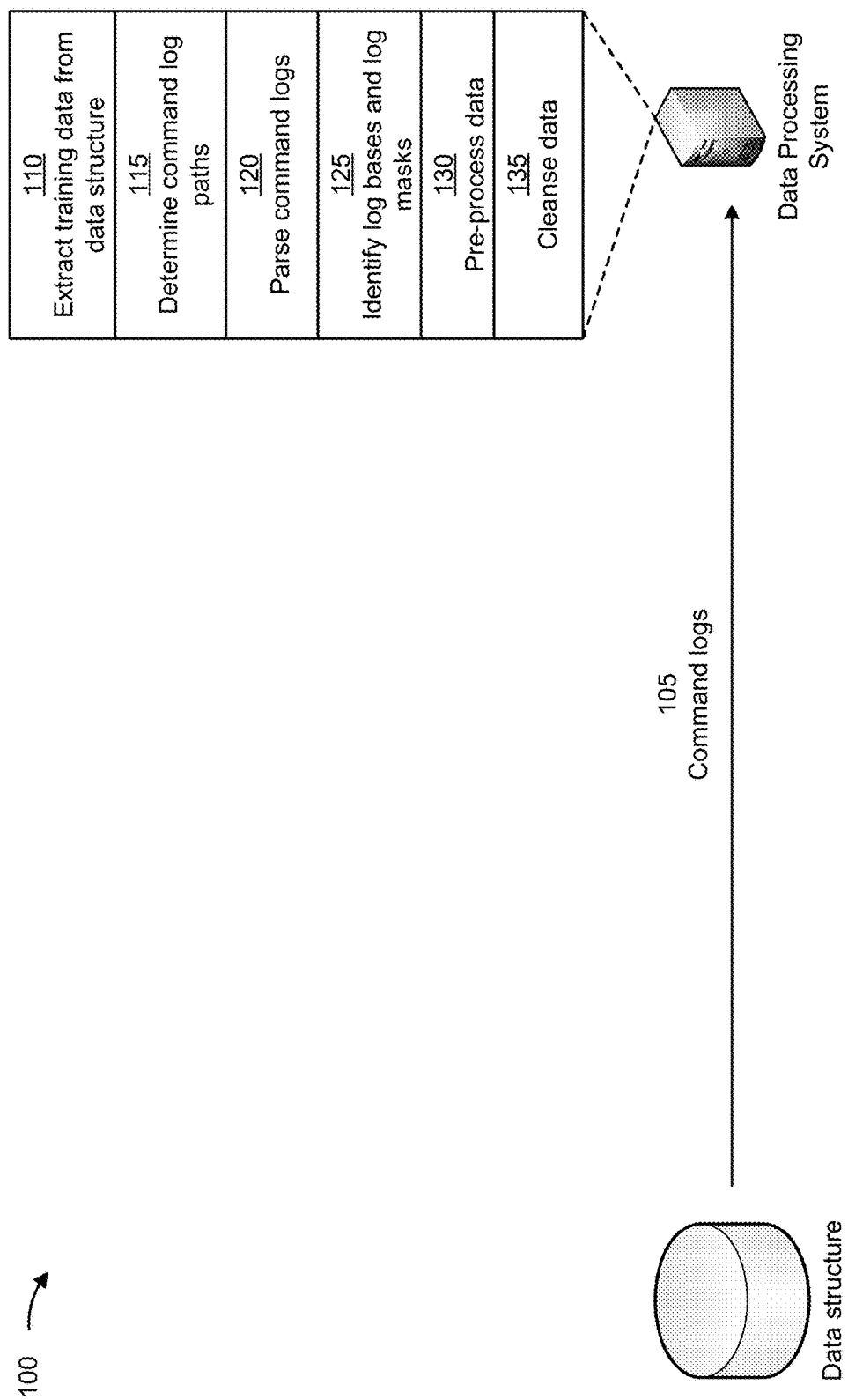
FIGS. 1A-1F are diagrams of an example implementation associated with artificial intelligence based log mask prediction for communications system testing.

The following detailed description of example implementations refers to the accompanying drawings. The same reference numbers in different drawings may identify the same or similar elements.

Network and/or system testing solutions play a vital role in the development and implementation of new technologies before such technologies can be used by the wider public. Testing of a network and/or system generates large quantities of software logs that include significant amounts of information associated with network or system states, network or system responses, network or system status, interactions with the network or system, runtime information, and/or performance of the network or system, among other examples. As an example, 5G or 6G (or other radio access technologies) telecommunications network testing solutions may generate software logs associated with information collected from performing tests on the network.

The software logs, which may also be referred to as "command logs", may include millions of lines of coded and uncoded text that is not readily understandable by unskilled people. There are experts at certain institutions that rely on extensive knowledge and experience to interpret the software logs. A log mining process is utilized for failure discovery and diagnosis, security, classification, and/or prediction, among other examples, based on the software logs. The software logs are also a source of diagnosis when malfunctions occur. When a malfunction occurs, experts may analyze the software logs to diagnosis a cause of the malfunction.

Even when analysis of a software log is automated, the software log may not include sufficient information for an automated process (or a manual review) to accurately perform log mining and/or failure discovery. Accordingly, before analysis of the software log is performed, a pre-analysis of a log mask is performed. The log mask includes a representation of a set of conditions associated with execution of one or more tests and generation of the software log. For example, the log mask may represent a configuration of a set of elements that are enabled or disabled during performance of one or more tests from which the software log is generated. In one example, a log mask can be generated using a graphical user interface (GUI) to indicate which elements (which may also be referred to as "log bases") are to be enabled or disabled. In another example, the log mask can be a hexadecimal string representing which elements are to be enabled or disabled. "Incorrect log mask" may refer to a log mask that results in a software log from which accurately performing log mining is not possible (or is unlikely).

As a simple example, a log mask could have an indication that all test elements are disabled, which could result, in one example, in a blank software log. In this case, it is evident that such a software log would be insufficient for log mining to determine a diagnosis of a malfunction associated with a device or system under test. However, in real scenarios, log masks may include representations of tens, hundreds, thousands, or even millions of test elements (or combinations thereof) or other parameters, and the suitability of a software log for accurate log mining may also be related to non-test parameters, algorithms being used for log mining, and/or other factors.

The current techniques for analyzing log masks are non-systematic, inefficient, and result in shortcomings and bottlenecks. For example, current techniques for analyzing log masks include a manual review of a resulting software log and multiple back-and-forth steps resulting in execution of many tests involving many different log masks. Not only do the current techniques require allocation and consumption of a large quantity of resources on a repeated basis, but the current techniques also fail to utilize valuable historical data from past resolved cases. Therefore, current techniques for analyzing log masks consume computing resources (e.g., processing resources, memory resources, and/or communication resources), and/or networking resources, among other examples, associated with incorrectly analyzing the log masks, making incorrect modifications to a testing system based on the incorrectly analyzed log masks, and/or correcting the incorrect modifications to the testing system, among other examples. Furthermore, when the testing system is being used to analyze real networks or systems under deployment and subject to malfunctions, a delay in obtaining a software log from which the malfunctions can be identified and corrected results in wasted resources associated with the real networks or systems.

Some implementations described herein enable artificial intelligence based log mask prediction for communications system testing (e.g., for software log data) using neural networks, such as deep neural networks (DNNs) and/or recurrent neural networks (RNNs). For example, a data processing system may obtain training data by extracting software logs and associated log masks from a data repository of stored test data. The data processing system may use one or more algorithms to extract, pre-process, cleanse, and parse the software logs and associated log masks, as described below. The data processing system may train one or more artificial intelligence models to predict, based on a first software log and a first log mask, a second log mask, which will achieve a suitable second software log for, for example, malfunction diagnosis.

As a result, a log mask may be obtained for generating a software log that will allow subsequent log mining without requiring information in an initial software log to be analyzed or interpreted (e.g., by a user or a device) and/or without requiring multiple back-and-forth iterations of generating test results, unsuccessfully analyzing the test results, and trying a new log mask to generate new test results. This conserves significant time associated with analyzing the software logs and fixing malfunctions that occur in devices, systems, and/or networks. Additionally, this conserves computing resources, and/or networking resources, among other examples, that would otherwise have been consumed in analyzing the software logs and associated log masks, making incorrect modifications to a network or system based on incorrectly analyzed software logs, and/or correcting the incorrect modifications to the network or system, among other examples.

FIGS. 1A-1F are diagrams of an example implementation 100 associated with artificial intelligence based log mask prediction for communications system testing. As shown in FIGS. 1A-1F, example implementation 100 includes a data processing system, and a data structure. The data structure may include a database, a table, and/or a list, among other examples, that stores command logs. These devices are described in more detail below in connection with FIG. 2 and FIG. 3.

As shown in FIG. 1A, and by reference numbers 105 and 110, the data processing system may receive access to a data structure storing command logs and extract training data from a data structure. For example, the data processing system may extract training data identifying a set of command logs. The command logs may be generated by a system or a network (e.g., a telecommunications network), among other examples. For example, a testing system may perform tests on components of a telecommunications network. The testing of the telecommunications network generates large quantities of command logs that include significant amounts of raw data associated with network states, network responses, network status, interactions with the network, runtime information, and/or performance of the network, among other examples. The command logs may include millions of lines of coded and uncoded text that is not readily understandable by unskilled people. The command logs may include historical test cases as well as resolved and reported cases. Each entry within the command logs may include static fields and dynamic fields, often in free-form natural language text that cannot be readily understood. The static fields may include text that is not variable, remains unchanged during an occurrence of an event, and is related to an event type. The dynamic fields may include text that is variable, that differs from one case to another case, and may be assigned at run-time. A system configuration set by the service provider may determine a form and content of each command log entry associated with a logged event. Although examples may be described herein in connection with telecommunications command logs, it should be understood that the techniques and implementations described herein may be similarly applied to command logs generated by other systems or networks, such as a data center system, a network routing system, or any other system or network.

The testing system and/or the telecommunications network may store the command logs in the data structure. In some implementations, the data structure may be maintained and/or managed by a service provider associated with the telecommunications network. The data processing system may provide or transmit, to the data structure, a request for the command logs and may receive the command logs from the data structure based on the request. In some implementations, the data processing system may receive a path identifying a location of the command logs at initialization. The data processing system retrieve the command logs from the identified path and may process the command logs. The command logs may be in a text-type format (e.g., may be in a .txt format). For example, the command logs may include alphanumeric characters and/or other characters or symbols.

In some implementations, the data processing system may receive data from which the command logs are to be extracted. For example, the data processing system may receive a table of data (e.g., data in row and column form) representing raw data associated with a set of system tests. In this case, the data processing system may extract command logs from the table of data (as well as generate log masks) as described below.

As shown by reference number 115, the data processing system may determine command log paths. For example, the data processing system may execute a log path finder script to identify a set of paths for accessing command logs from within a data structure storing raw data. In this case, the data processing system may identify a quantity of paths for a quantity of command logs determined to be suitable for generating one or more artificial intelligence models. For example, the data processing system may identify a threshold quantity of command log paths associated with a threshold quantity of command logs to enable generation of a training data set and a validation data set for artificial intelligence model training. In this case, the quantity of command log paths that are identified may be a static quantity (e.g., a fixed quantity to enable training of an artificial intelligence model in a single procedure) or a dynamic quantity (e.g., a quantity that is based on an accuracy of a trained artificial intelligence model and incremented until the artificial intelligence model achieves a threshold level of accuracy without overfit).

As shown by reference number 120, the data processing system may parse the command logs. For example, the data processing system may use a log path extraction script to recursively search for command logs, within raw data received from a data structure, using the set of paths. In some implementations, the data processing system may identify command logs when using the log path extraction script. For example, the data processing system may parse raw data and identify one or more indicators of a command log at a data location identified by a path of a set of paths. The one or more indicators of the command log may include alphanumeric data, program code, or another type of indicator that correlates with a command log being present at a particular data location.

The log path extraction script may receive, as input arguments, a set of attachment locations (e.g., a set of paths) in a data structure and recursively attempt to identify command logs within the data structure for a particular set of parameters that identify cases to be searched. In this case, for each attachment location, the log path extraction script may evaluate folder contents and, for each file, identify a file format. Based on a type of file format (e.g., a text file format, such as ".txt"), the log path extraction script may open a file and determine whether the file includes a command log. For another type of file format (e.g., an archived file format, such as ".zip" or "0.7z"), the log path extraction script may convert the file from a first file format to a second file format to enable the log path finder script to open the file (in the second format) and evaluate the file.

As shown by reference number 125, the data processing system may identify log bases and log masks associated with the command logs. For example, the data processing system may use a command log parser script to identify a log mask for each command log. The log parser script extracts log masks and configurations from a file that includes a command log and appends the log masks and configurations to a data structure storing the command log. In some implementations, the data processing system may extract information associated with a command log and a log mask thereof, such as errors, warnings, and configuration commands, which may be used for artificial intelligence model training, as described below. For example, the data processing system may use the log parser script to filter a command log for sections (e.g., lines) relating to errors and warnings and/or for sections relating to configuration. In each case, the data processing system may identify relevant data (e.g., errors, warnings, or configurations) using, for example, key words (e.g., a list of key words to identify or a list of key words to ignore), which indicate a presence or absence of relevant data. Although described in terms of words, some implementations described herein may use other key information to identify relevant data. In some implementations, the data processing system may read raw data into a handler, check the raw data against one or more key word lists, and determine whether to write the raw data to an output file.

In some implementations, the data processing system may use a mask parser script to retrieve log masks from command log files stored in a database. For example, after writing the raw data to an output file (e.g., as a log mask, a configuration, a set of errors or warnings, or another category of relevant data), the data processing system may use a mask parser script to read each command log file, search for a key string, and use the key string to identify log mask information, a case name (e.g., a test), a log path file, or a timestamp, among other examples. In some implementations, the data processing system may use the mask parser script to identify a dictionary for the command log file and may convert the dictionary into a data frame with a set of rows corresponding to a case relating to a test for which the command log was generated.

A log mask, as described above, is a representation of a set of test elements that are activated or not activated in connection with a test for which the command log is generated. For example, the data processing system may parse a command log to identify, in program code or alphanumeric indicators of the command log, settings of a test for which the command log is generated. In this case, the data processing system may record the settings as a log mask, which may take the form of a graphical representation or a digit string (e.g., an alphanumeric representation, a bit map representation, a digital representation, or a hexadecimal representation), among other examples.

In some implementations, the log mask may be represented as a log base. For example, when the log mask is a hexadecimal string, in one format, the log mask may be mutable based on a software context (e.g., a software release), which may result in usability, model training, and/or performance issues. In this case, the data processing system may normalize the log mask, such that log masks are software context independent. For example, the data processing system may use a log communication builder function and an associated GUI to translate a log mask to a log base. The log base allows for enabling or disabling test elements from a list of modules in a software-context-independent manner. In some implementations, the data processing system may encode the log mask using one-hot encoding to enable evaluation of the log mask in artificial intelligence model training. For example, the data processing system may convert the log mask to numerical data for use in machine learning.

As shown by reference numbers 130 and 135, the data processing system may pre-process and cleanse data included in the command logs to obtain pre-processed, cleansed training data. For example, the data processing system may convert the raw data from a markup language format to a text format, to generate text data. For example, raw data may be provided in a markup language format, such as hypertext markup language (HTML) format. In some implementations, the data processing system may convert a type of some text data. For example, the data processing system may convert text data such that all the text data is in a lowercase format. The data processing system may convert the raw data from the markup language format to the text format (e.g., the text data) for further processing. The raw data may be converted or transformed into the text data, which is unified clean data that is compatible with an artificial intelligence model. The data processing system may not perform processing on the actual raw data. The data processing system may read the raw data from the data structure, may process the raw data, and may write new clean data to a data structure associated with the data processing system. In this way, the data processing system may ensure that the valuable actual raw data is still available for any future purposes.

In some implementations, the static fields, the dynamic fields, and elements of each within the command logs may be separated by a variety of delimiters, such as semicolons, commas, brackets, white space, next lines, and/or the like. The data processing system may eliminate the delimiters or other configured characters, regular expressions, or stop words from the command logs so that the clean data may be processed by the one or more artificial intelligence models. If the delimiters are not removed or replaced, performance of one or more artificial intelligence models may be reduced. Furthermore, if the delimiters are not removed, allocation of labeled data for training the one or more artificial intelligence models may be much more challenging and less effective. The data processing system may perform one or more other pre-processing operations, such as: changing name strings of the text data to a new name; extracting pre-log data, associated with test cases, from the text data; removing files with less than a threshold quantity of lines from the text data to generate modified text data; extracting user equipment (UE) data, associated with a particular quantity of UEs, from the modified text data; decoding radio resource control (RRC) messages in the modified text data to generate decoded RRC messages; extracting marker data, associated with particular markers, from the modified text data; removing files associated with timestamps and a first set of the test cases from the modified text data to generate further modified text data; extracting test case data, associated with a second set of the test cases, from the further modified text data; and/or removing, from the further modified text data, lines that include particular syntax (e.g., "python.exe," syntax indicating that a test executed and passed, syntax indicating that an action is waiting to be performed); among other examples.

The output of the pre-processing operation(s) may include a data structure with a file name identifier column, a verdict column, and/or a quantity of UEs column, among other examples. The verdict column may include entries for binary values (e.g., "1" for Pass or "0" for Fail) indicating whether a command log was associated with a pass test case or a failure test case (e.g., "PASS: The test ran successfully and passed" or "FAIL: The test ran to completion, test conditions not met") and log masks that were used for the test cases. The quantity of UEs columns may include entries that associate the quantity of UEs data for validation purposes. For example, if an objective is to extract single UE cases and perform the pre-processing tasks on the single UEs, the quantity of UEs column may include a value of one.

In some implementations, the data processing system may detect and remove one or more outlier data sets (e.g., one or more files) from pre-processed log data. For example, the data processing system may detect the one or more outlier data sets (e.g., one or more files) from pre-processed log data based on a length or a size of the one or more outlier data sets. In other words, the data processing system may detect one or more data sets (e.g., one or more files) that are outliers in terms of size as compared to the rest of the pre-processed log data. This may reduce training time for one or more artificial intelligence models (e.g., as explained in more detail elsewhere herein). Additionally, this may reduce a likelihood of overfitting or incorrect training that may result from using pre-processed log data having an unusually small or large size, thereby improving a performance of the training of the one or more artificial intelligence models by removing such outlier data sets.

In some implementations, the data processing system may concatenate (e.g., combine or link together) the pre-processed log data (e.g., after removing the outlier data sets) to obtain a set of concatenated pre-processed log data. The set of concatenated pre-processed log data may form a training corpus for the one or more artificial intelligence models. Similar to the command logs containing the raw data, the training corpus may be associated with an alphanumeric format, such as a text-type format. For example, the training corpus may be a file (or multiple files) having a .txt format.

In some implementations, the data processing system may generate a dictionary of all words in the vocabulary of the training corpus. For example, the data processing system may identify a set of unique words among the training corpus. The data processing system may filter the dictionary according to one or more rules to maintain a portion of the dictionary and delete another portion of the dictionary, thereby generating a cleansed dictionary. Using the cleansed dictionary, the data processing system can reconstruct fields within the data structure storing command log data, thereby dropping any words or characters not present in the cleansed dictionary.

In some implementations, the data processing system may perform an encoding operation for the set of concatenated pre-processed log data. For example, the data processing system may generate a set of vocabulary tokens that are based on alphanumeric characters included in the training corpus. For example, the data processing system may perform a tokenization of the training corpus. The data processing system may scan and/or analyze the training corpus to identify tokens (e.g., vocabulary tokens). For example, the tokens (e.g., vocabulary tokens) may be unique character included in the training corpus. As used herein, "unique characters" may refer to each character (e.g., letter, number, symbol, or other character) that appears in the training corpus at least once.

For example, the data processing system may scan the entire training corpus to extract case data (e.g., case titles, descriptions, comments, such as private comments or public comments) to identify characters that appear in the training corpus at least once. Each character that appears in the training corpus at least once (e.g., the unique characters in the training corpus) may form the set of vocabulary tokens. In some implementations, the data processing system may use an input data cleansing to tokenize the data. For example, the data processing system may reconstruct fields within a data structure storing command log data, dropping any words or characters not present in a cleansed dictionary generated from the vocabulary tokens. The data processing system may load the reconstructed fields as input data and apply filtering techniques, such as removing certain characters, removing address information, reducing non-alphanumeric characters (e.g., sentence delimiters), removing numbers, removing memory location indicators, or removing non-English characters, among other examples. Removal of data may be based on one or more rules for cleansing the data, removing words, and/or modifying words.

Using the unique characters (that have not been removed) in the training corpus as the tokens for tokenization of the training corpus may simplify the tokenization operation because the quantity of unique characters included in the training corpus (e.g., in the command logs) may be significantly smaller than other character lists used for tokenization, such as American Standard Code for Information Interchange (ASCII) table of 256 characters (e.g., 8 bits) or an ASCII table of 128 characters (e.g., 7 bits). For example, a quantity of unique characters in the training corpus may be in the range of 90 to 100 characters. Therefore, using the unique characters in the training corpus as the vocabulary tokens may conserve processing resources and/or time associated with encoding or tokenizing the training corpus.

The data processing system may generate an array that can be used to convert between the vocabulary of the training corpus (e.g., the unique characters) and index values (e.g., a numeric space). The array may enable a two-sided system in which the data processing system is enabled to convert or encode the text in the training corpus to a numeric space (e.g., using index values) and to convert the numeric space (e.g., the index values) to an alphanumeric space (e.g., the text).

In some implementations, the data processing system may encode the training corpus to obtain a set of encoded data. For example, the data processing system may encode the training corpus using the set of vocabulary tokens that are based on alphanumeric characters included in the training corpus (e.g., using the array generated as described above). The data processing system may encode the entire training corpus (e.g., to generate encoded text (ET) of the training corpus). Alternatively, the data processing system may encode a subset of the training corpus. The length or size of the encoded text ($|l_{et}|$) of the training corpus may be equal to the length of size of the training corpus ($l_{tc}$).

In some implementations, the data processing system may encode the training corpus to obtain a set of encoded data blocks. In some implementations, the data processing system may detect one or more outlier encoded data blocks from the set of encoded data based on a size of the one or more outlier encoded data blocks. For example, the data processing system may utilize inter-quartile range (IQR) or a standard deviation technique to identify encoded data blocks that have a size that is outside of a threshold range. The data processing system may remove any identified outlier encoded data blocks from the set of encoded data blocks associated with the training corpus.

In some implementations, the data processing system may calculate or determine a sequence length ($l_s$) based on a statistical parameter associated with the training corpus. The sequence length may be adaptive to the data or information included in the training corpus (e.g., may be based on the data or information included in the training corpus). In this way, the sequence length of sequences that form a training data set for the one or more artificial intelligence models, as explained in more detail elsewhere herein, may have a length that is adapted to the data or information included in the training corpus. This may reduce, or eliminate, the need for the data processing system to perform techniques to ensure sequences that are input to the one or more artificial intelligence models all have the same length, such as a zero padding technique, or another technique. This, in turn, conserves processing resources and reduces a complexity associated with training the one or more artificial intelligence models.

To calculate the sequence length, the data processing system may detect a set of data blocks from the training corpus based on one or more indicators included in the alphanumeric characters included in the training corpus. The indicators may be identifiers, characters, or other symbols that indicate breaks or partitions between meaningful information in the command logs. For example, the one or more indicators may be command indicators. For example, in a telecommunications command log, the blocks may be text or information included between indications and confirmations as indicated by the command log (e.g., the command log may include "I:" to show an indication starting an input or test information and a "C:" to indicate a confirmation of the end of meaningful information). A block may be detected as the information or text between the "I:" and the "C:" included in the training corpus. The data processing system may determine a size or length of each data block included in the set of data blocks. The data processing system may preserve a sequential order in which the blocks are captured, which may be a parameter for performing a prediction, as described below.

In some implementations, the data processing system may remove any data blocks, from the set of data blocks, that are associated with an outlier length (e.g., identified using IQR or another technique in a similar manner as described in more detail elsewhere herein). The data processing system may calculate a statistical parameter based on sizes of data blocks included in the set of data blocks to obtain the sequence length. In this way, the sequence length may be adapted to a size of blocks of meaningful information included in the training corpus. The sequence length may be used to generate a set of training sequences for the DNN (e.g., from the encoded text of the training corpus). This may improve a performance of the training of the DNN (e.g., as compared to using a fixed value as the sequence length) because the training sequences have lengths or sizes that are adapted to the information included in the training corpus.

For example, the data processing system may calculate the sequence length according to the following equation:

$$l_s = \sum_{i=1}^{n_B-n_o} \frac{|B_i|}{n_B - n_o}$$

where $l_s$ is the sequence length, $n_B$ is the quantity of detected blocks $B_i$, and $n_o$ is the quantity of outlier blocks. For example, the data processing system may detect ng blocks $B_i$ in the training corpus. The data processing system may calculate a length or size, $|B_i|$, of each detected block for i=1 to i=$n_B$. The data processing system may detect $n_o$ outlier blocks based on the calculated lengths or sizes (e.g., using IQR or another technique). The data processing system may remove the $n_o$ outlier blocks from the set of data blocks. The data processing system may calculate $l_s$ using the equation above. In the equation above, the statistical parameter used to calculate the sequence length $l_s$ is an average of the lengths or sizes of the detected blocks (e.g., with outlier blocks removed).

In some other implementations, a different statistical parameter may be used to calculate the sequence length, such as a median length or size of the detected blocks, a mode of the length or size of the detected blocks, and/or a weighted average of the length or size of the detected blocks (e.g., where certain blocks have a different weight applied to the length or size when calculating the average), among other examples. The data processing system may determine a total quantity of training sequences, |S|, based on a length of the encoded text of the training corpus dived by the calculated sequence length. For example, the data processing system may determine $|S|=l_c/l_s$, where $l_c$ represents a corpora length. For a batch size |b|, the artificial intelligence system may be configured to iterate through |S|/|b| sets for each epoch of training to be completed. By removing outliers and truncating above-average sentence lengths to be an average sentence length a resulting embedding scheme is adapted to the dataset, which leads to a dense tensor space that captures most valuable semantic information regarding the dataset.

Figure 1B:
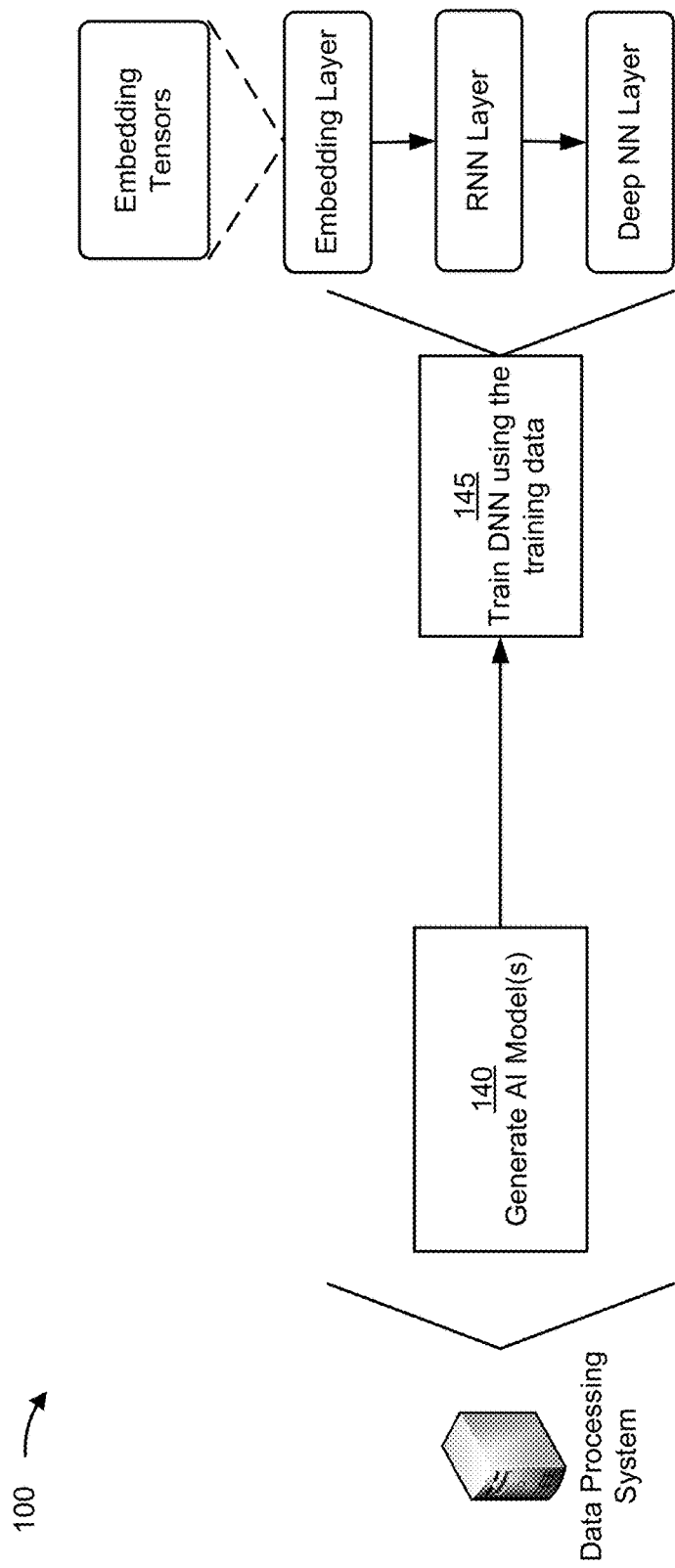

As shown in FIG. 1B, and by reference numbers 140 and 145, the data processing system may train one or more artificial intelligence models using the training data set. For example, the data processing system may train a first model to analyze data in command logs and log masks and a second model to analyze data in command logs, log masks, and ticket data (e.g., tickets registered in connection with a ticket process, as described below). In some implementations, the data processing system may train, as one or more of the one or more artificial intelligence models, a sequential DNN. The sequential DNN is trained using the training data set and is optimized based on one or more hyperparameters to obtain a set of embedding tensors associated with an embedding layer of the sequential DNN. The one or more hyperparameters may include a quantity of epochs associated with training the DNN, a size associated with the set of vocabulary tokens (|V|), the batch size (|b|), an embedding dimension size ($d_E$), and/or a quantity of neurons or hidden units associated with a recurrent neural network (RNN) layer of the sequential DNN ($n_u$), among other examples. In some implementations, the data processing system may receive a user input indicating values for one or more of the hyperparameters. For example, the data processing system may receive an indication of respective values for the one or more hyperparameters. Additionally, or alternatively, the data processing system may determine values for one or more of the hyperparameters.

In some implementations, the DNN may include an embedding layer as a first layer (e.g., an input later), an RNN layer as a second layer, and a dense NN layer as a third layer (e.g., an output layer). The embedding dimension size ($d_E$) may define a quantity of features that the DNN may capture and compute automatically (e.g., features of the command logs). A large value for $d_E$ may result in a large tensor space which may cause overfitting and increase processing resources required for training. A small value for $d_E$ may result in a small-scale and poor tensor space, which typically induces bias as a result of a simplistic representation of the features of the command logs. Therefore, the value for $d_E$ may be selected to balance between the two extremes described above. In some implementations, the value for $d_E$ may be between 100 and 1000, or more specifically, between 700 and 800. Selecting a dimension in the above-mentioned range may account for a dataset with large sentences of different lengths and the use of a self-training (e.g., self-supervised contrastive learning optimization problem) technique. The input hyperparameters for the embedding layer may be the size associated with the set of vocabulary tokens, the batch size, and/or the embedding dimension size (e.g., may be (|V|, |b|, $d_E$)), among other examples.

Following the embedding layer, an RNN layer may be added to the DNN. The RNN may be a long short-term memory (LSTM) RNN layer or a gated recurrent unit (GRU) RNN layer, among other examples. The type of RNN layer (e.g., LSTM or GRU, among other examples) may be another hyperparameter associated with the DNN. The RNN network layer may be associated with input hyperparameters, from the one or more hyperparameters, including a quantity of neurons (e.g., artificial neurons) or hidden units ($n_u$), and a recurrent initializer, among other examples. The quantity of neurons (e.g., artificial neurons) or hidden units ($n_u$) may define a dimension of a vector that is passed from the RNN layer to another layer. Similar to the value for $d_E$, a value of $n_u$ may be selected to balance between overfitting (e.g., when the value of $n_u$ is too large) and not fitting the data sufficiently (e.g., when the value of $n_u$ is too small).

The last layer (e.g., the output layer) of the DNN may be a dense NN. For example, the dense NN may be added to the DNN after the RNN. The dense NN layer may be associated with an input hyperparameter including the size associated with the set of vocabulary tokens ($|V|$), among other examples. In some implementations, the data processing system may deploy or execute a softmax classifier function to classify between different possible choices within the vocabulary (e.g., the text of the training corpus) each pass through the training process.

Based on training and/or converging the DNN using a set of optimization equations, the set of embedding tensors associated with the embedding layer may be obtained by the data processing system. The set of embedding tensors may be weights of the embedding layer applied to hidden units or neurons $n_u$ in the embedding layer. The set of embedding tensors may be a numerical representation of the pre-processed log data (e.g., of the text in the command logs). For example, an embedding tensor may represent a feature of the text in the command logs. By training the DNN to obtain the set of embedding tensors, the data processing system may obtain a numerical representation of the text in the command logs. In some implementations, the data processing system may train an artificial intelligence model based on the set of embedding tensors. For example, the data processing system may train the artificial intelligence model to identify information associated with the text in the command logs based on the set of embedding tensors.

Figure 1C:
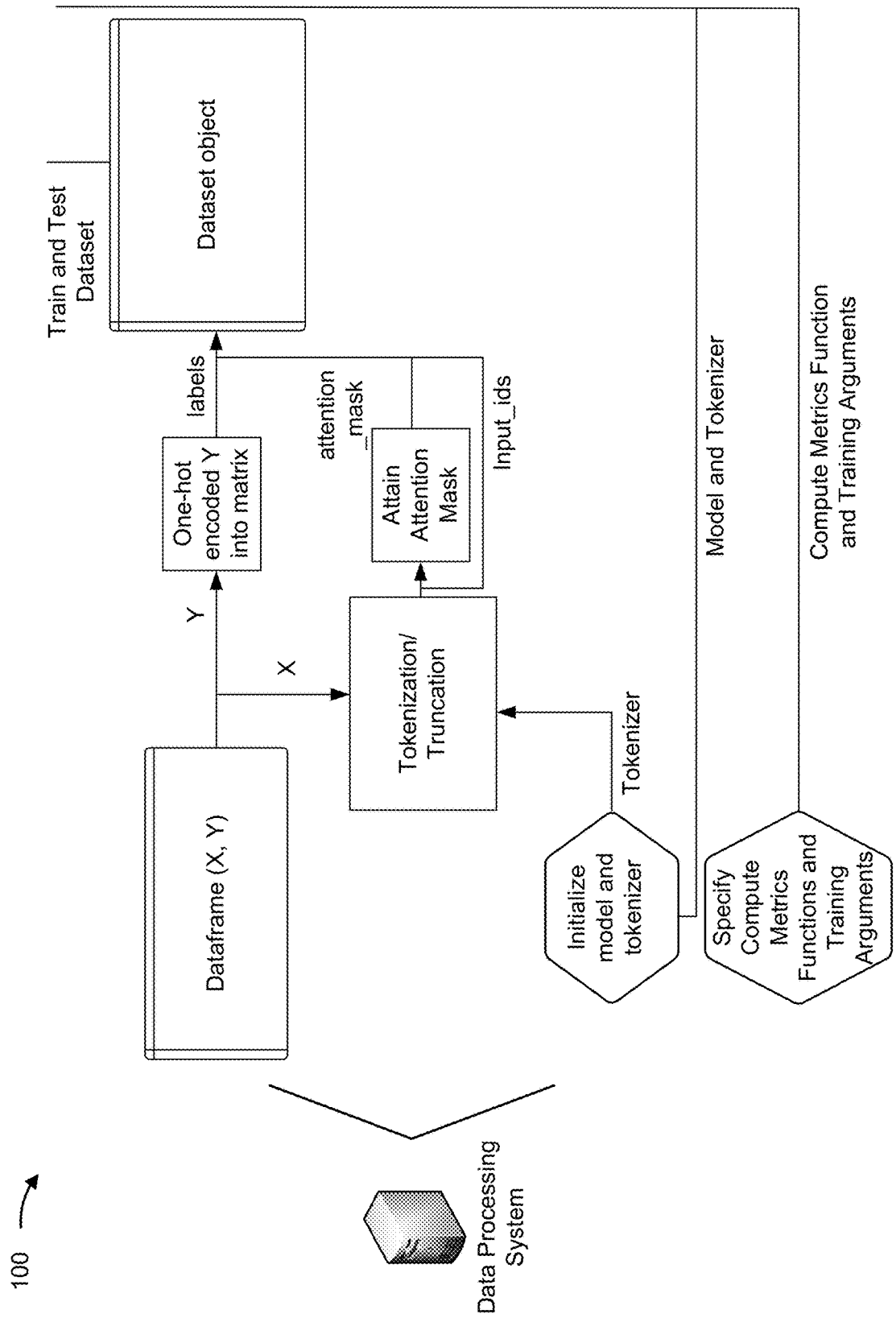

As shown in FIG. 1C, the data processing system may generate a set of inputs, which are provided to a constructed training object. The constructed training object is described in more detail with regard to FIG. 1D. The data processing system receives a data frame including first data Y and second data X. The first data Y may represent a set of log bases, which may be one-hot encoded into a matrix format. Based on one-hot encoding the set of log bases into the matrix format, a set of associated labels are provided as information included in a dataset object. The data processing system may apply a tokenization and/or truncation process to the second data X, which may represent contextual data regarding a set of test cases and associated command logs (e.g., a title of a test case, a description of a test case, a set of comments regarding a test case, a content of a command log), as described above. The truncation process ensures that each sample of the second data X is associated with a common length and may include adding padding information. In some implementations, a tokenizer function is used to tokenize the second data X. The data processing system may use a function to generate an attention mask and a set of input identifiers regarding the second data X. The attention mask and the set of input identifiers are included in the dataset object. The data processing system may provide the dataset object, information identifying a model and tokenizer, a compute metrics function, and/or a set of training arguments as output from the input generation phase described in FIG. 1C (e.g., as input to a trainer object, as described below).

Figure 1D:
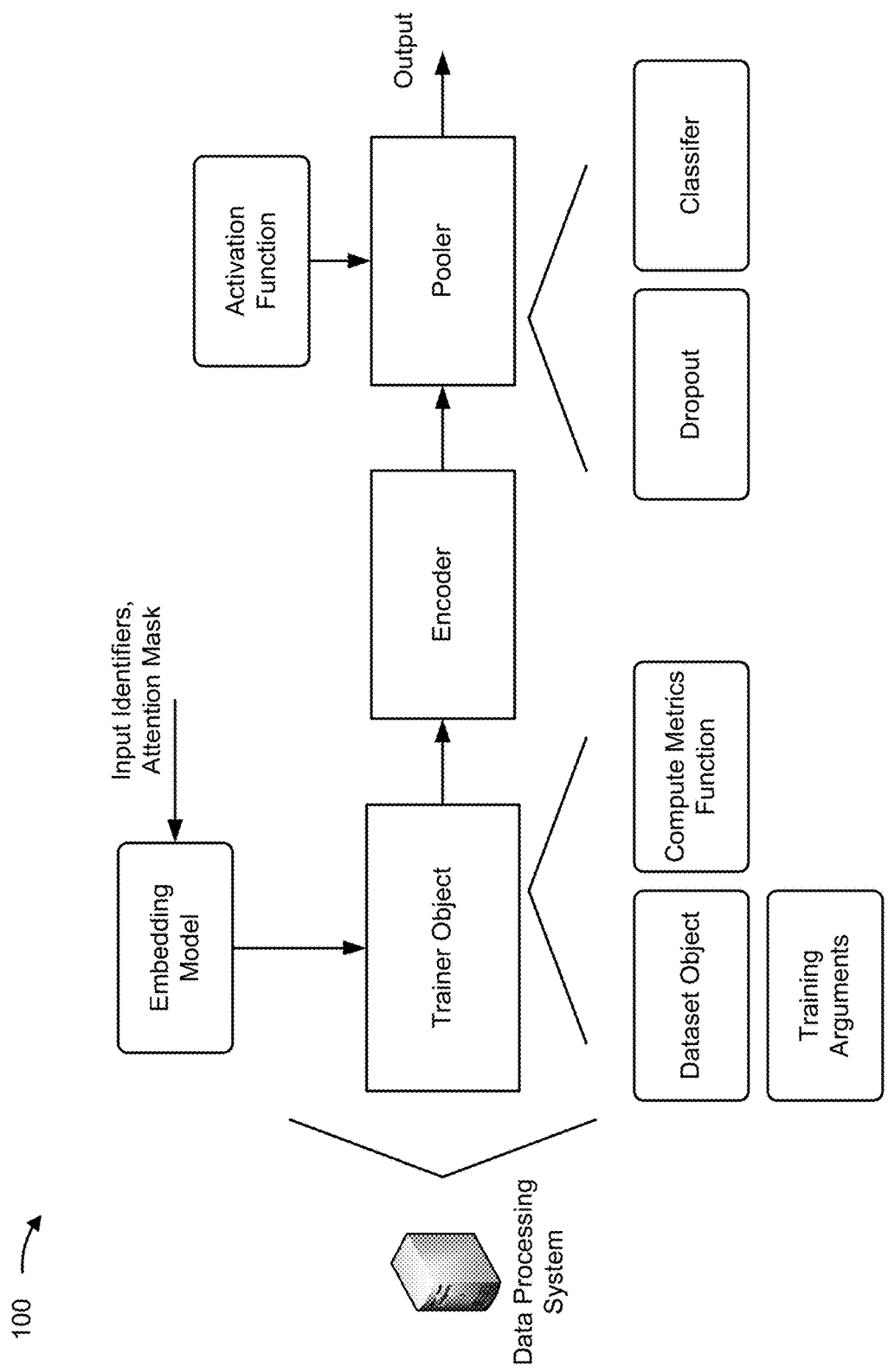

As shown in FIG. 1D, the data processing system may generate an output using a set of components associated with an embedding model. The data processing system may pass inputs, such as the dataset object, the compute metrics function, and the set of training arguments, to a constructed training object. The constructed training object may call for an embedding model, as described above, for training using the inputs. The embedding model may have the input identifiers and the attention mask passed to an embedding stage. The embedding model may use a transformer-based algorithm, such as a sentence transformer to extract features from, for example, log messages. The embedding model may use multi-classification to classify command logs associated with the log messages to log base labels. For example, the embedding model may use a multi-output classifier and a support vector machine (SVC) classifier for classifying log messages to log base labels. In some implementations, the embedding model may have all possible log bases as possible classifications to which the command logs are applied, rather than only log bases that actually appear in a dataset from which the command logs are taken. This may achieve a higher overall accuracy than using only log bases actually appearing in the dataset.

The trainer object may generate, as output, a set of embeddings, as described above, which are passed to an encoder. The encoder may include a quantity of hidden layers, which the data processing system may configure (e.g., when the embedding model is initialized). For example, the data processing system may configure 6 hidden layers for the encoder. The encoder may generate encoded output, which is passed as data to a pooler. The pooler may apply an activation function to generate an intermediate output, to which a dropout and a classifier are applied to generate a final output form the pooler.

Figure 1E:
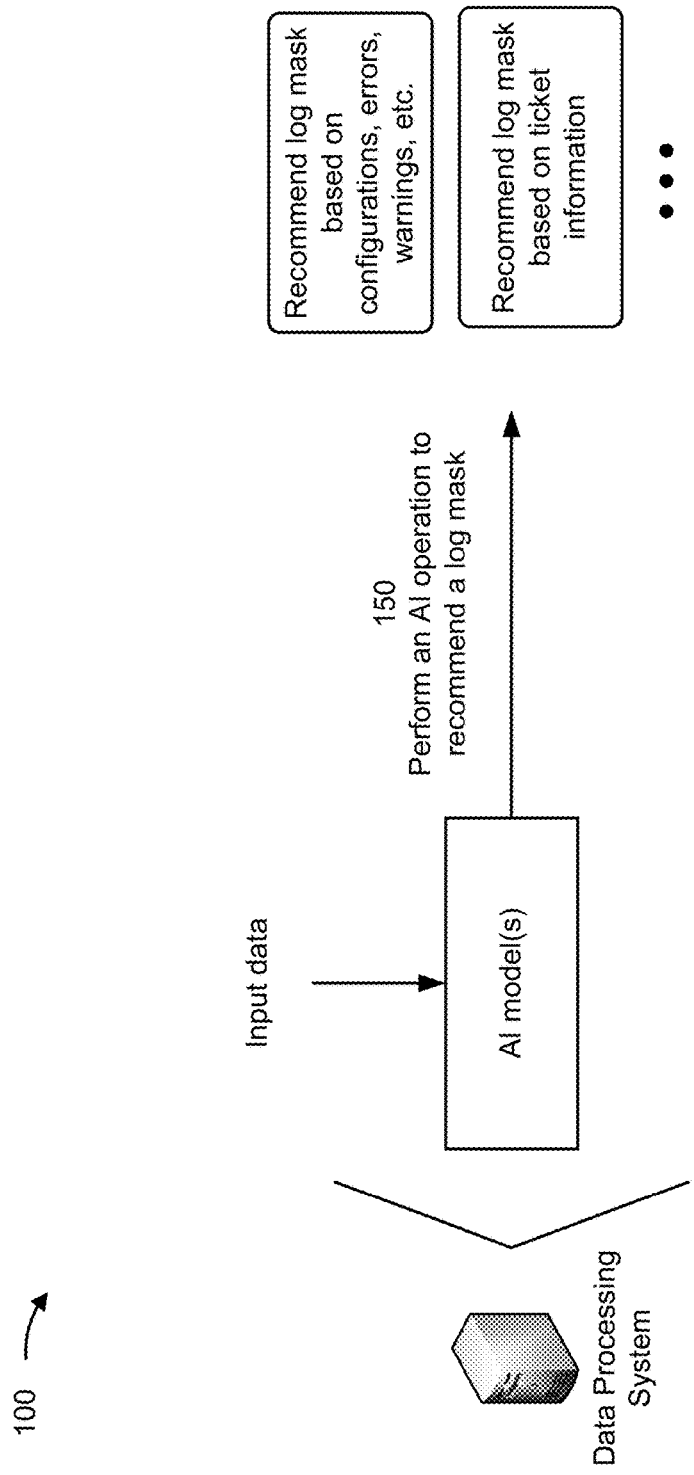

As shown in FIG. 1E, and by reference number 150, the data processing system may perform an artificial intelligence operation using the set of embedding tensors to obtain information associated with the command log data. For example, performing the artificial intelligence operation may include recommending, using an artificial intelligence model that is trained based on the set of embedding tensors (e.g., that is trained based on using the set of embedding tensors as an input to the artificial intelligence model), a new log mask for generating a new command log based on input information (e.g., a previous command log associated with a previous log mask). As another example, performing the artificial intelligence operation may include performing a similarity analysis of the set of log data to one or more other sets of log data. For example, based on providing embedding tensors of different command logs and log masks, the artificial intelligence model may find sets of command logs and log masks that have a threshold degree of similarity. In this case, the artificial intelligence model may output a log mask as a recommendation based at least in part on identifying a similarity between an input command log and another command log in the training data for which a corresponding log mask resulted in successful log mining.

In some implementations, the data processing system may provide an application programming interface (API) with which an artificial intelligence operation can be triggered. For example, the data processing system may receive a message from a client device requesting that an artificial intelligence operation be performed to generate a log mask. In this case, the client device may represent a user device (e.g., being used by a technician overseeing testing) or by a testing device itself (e.g., which may autonomously output results and request a log mask for a new test).

Figure 1F:
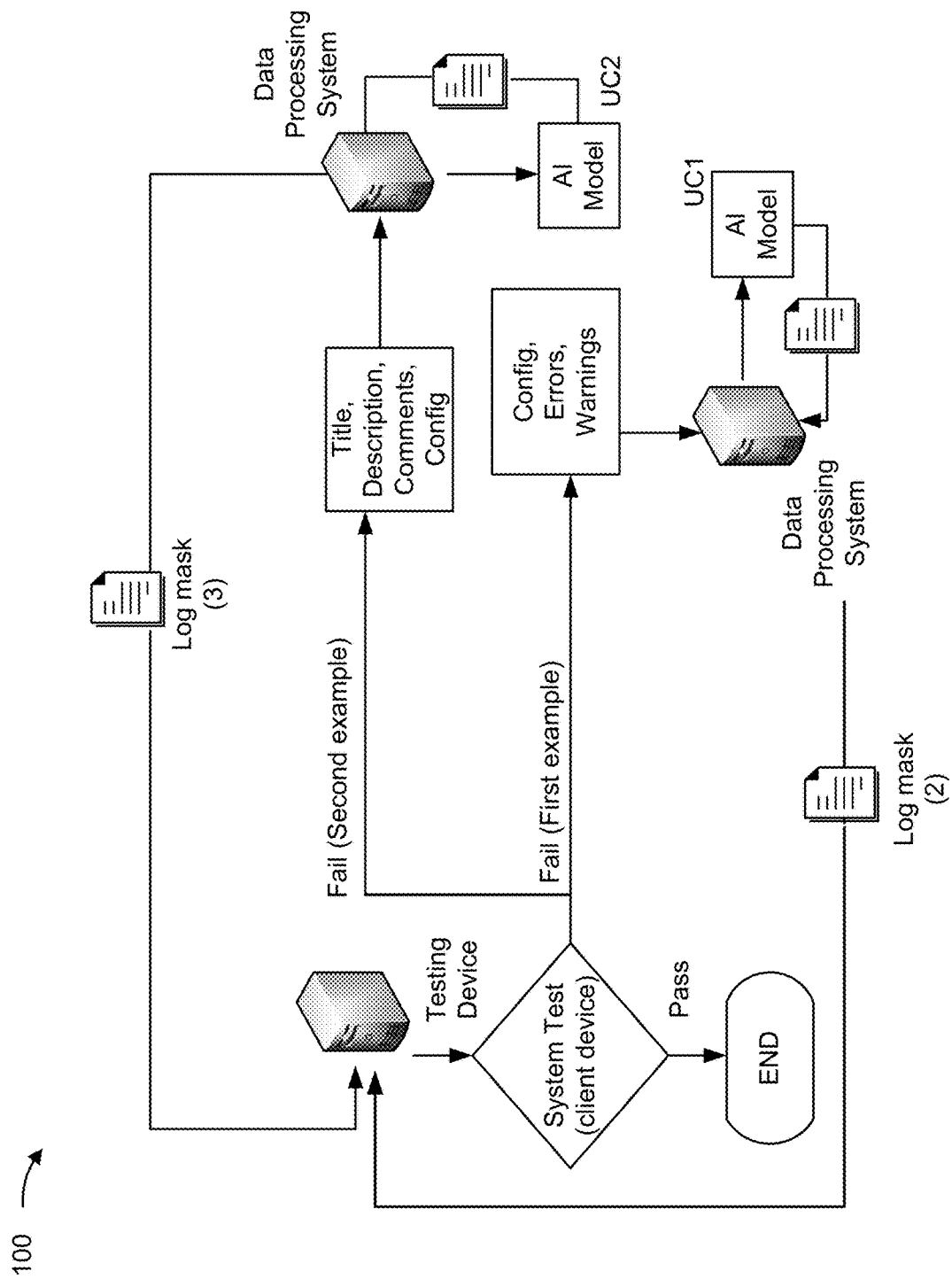

FIG. 1F shows a workflow for performing an artificial intelligence operation. In a first example, a testing device may perform testing. If testing is successful (e.g., no malfunction is detected), then log mining may not be performed, in some cases, and a log mask may not be requested for a subsequent test. In contrast, if the testing is unsuccessful (e.g., either as a result of a detected failure or as a result of inconclusive results), the testing device may transmit a first command log to the data processing system. The data processing system may use the command log, a set log configuration, a set of errors, a set of warnings, or a log mask, among other examples, as inputs to a first artificial intelligence model (UC1). The data processing system may generate a suggested second log mask and transmit the second suggested log mask to the testing device for further testing. In some implementations, the data processing system may be integrated into a supervised process. For example, a user may review the second log mask to determine whether to use the second log mask for the testing device and may provide feedback to the data processing system if the user determines that the second log mask is inaccurate. In this case, the data processing system may regenerate the second log mask using the feedback to improve the first artificial intelligence model, thereby using a supervised learning technique to achieve improved accuracy.

In a second example, when testing is unsuccessful (or when the second log mask is determined to be inaccurate), additional information may be generated and provided to the data processing system for processing using a second artificial intelligence model (UC2). For example, a ticket may be created, which includes additional information, such as a title, a description, a set of comments, a command log, or a log configuration, among other examples. Additionally, or alternatively, the ticket may have information regarding the testing device, the test, or other information not provided to the data processing system for analysis using the first artificial intelligence model. In this case, the data processing system uses the additional information in connection with the second artificial intelligence model to generate a third log mask. By including additional information, the data processing system may generate a suggested log mask with increased accuracy (e.g., but at a cost of increased processing or delay associated with information gathering).

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
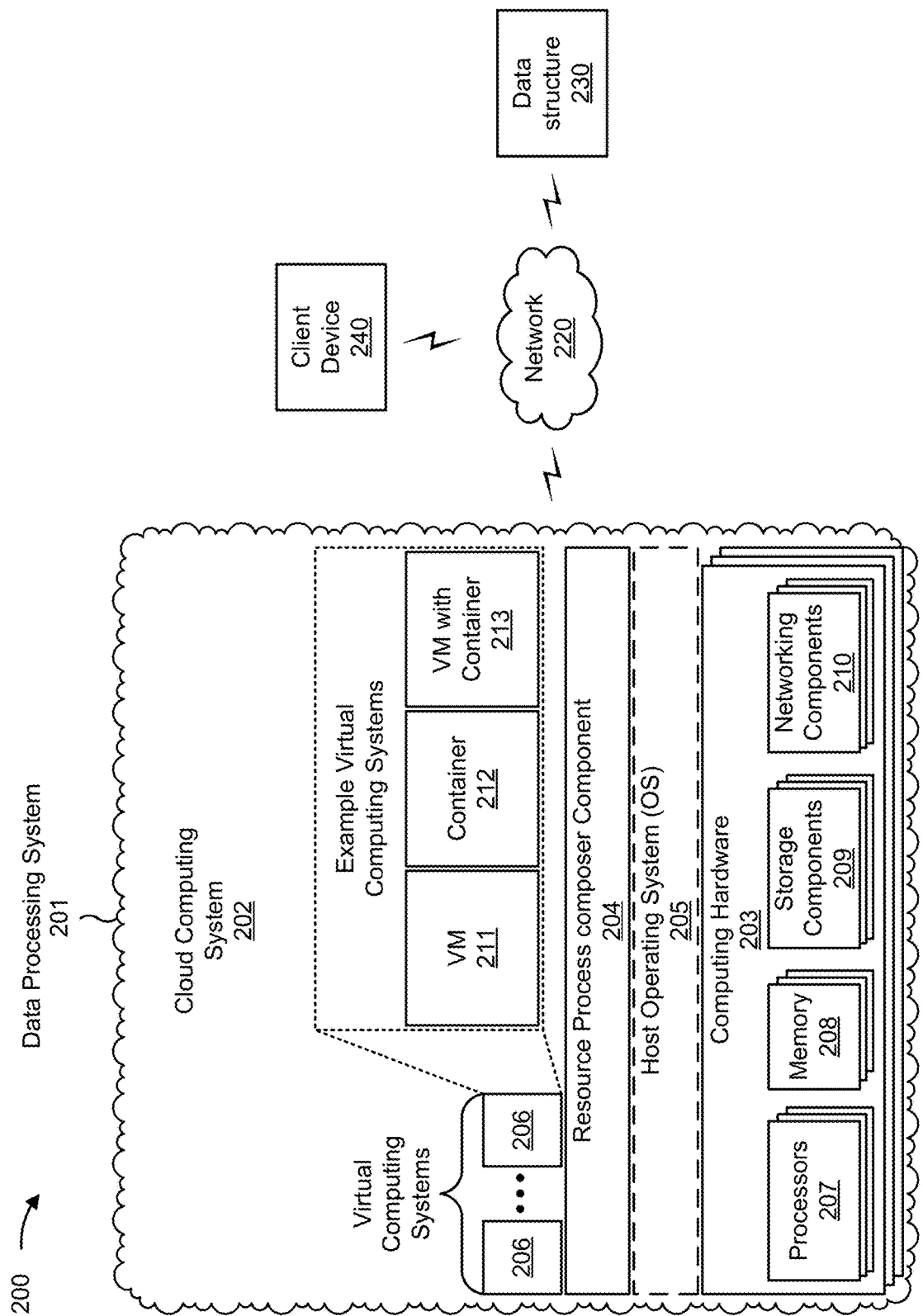
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a data processing system 201, which may include one or more elements of and/or may execute within a cloud computing system 202. The cloud computing system 202 may include one or more elements 203-213, as described in more detail below. As further shown in FIG. 2, the environment 200 may include a network 220, a data structure 230, and/or client device 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the data processing system 201 may include one or more elements 203-213 of the cloud computing system 202, may execute within the cloud computing system 202, and/or may be hosted within the cloud computing system 202, in some implementations, the data processing system 201 may not be cloud-based (e.g., may be implemented outside of a cloud computing system) or may be partially cloud-based. For example, the data processing system 201 may include one or more devices that are not part of the cloud computing system 202, such as a device 300 of FIG. 3, which may include a standalone server or another type of computing device. The data processing system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The data structure 230 includes one or more devices capable of receiving, generating, storing, processing, and/or providing information, as described elsewhere herein. The data structure 230 may include a communication device and/or a computing device. For example, the data structure 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 230 may communicate with one or more other devices of the environment 200, as described elsewhere herein.

The client device 240 may include one or more devices capable of receiving, generating, storing, processing, and/or providing information, as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
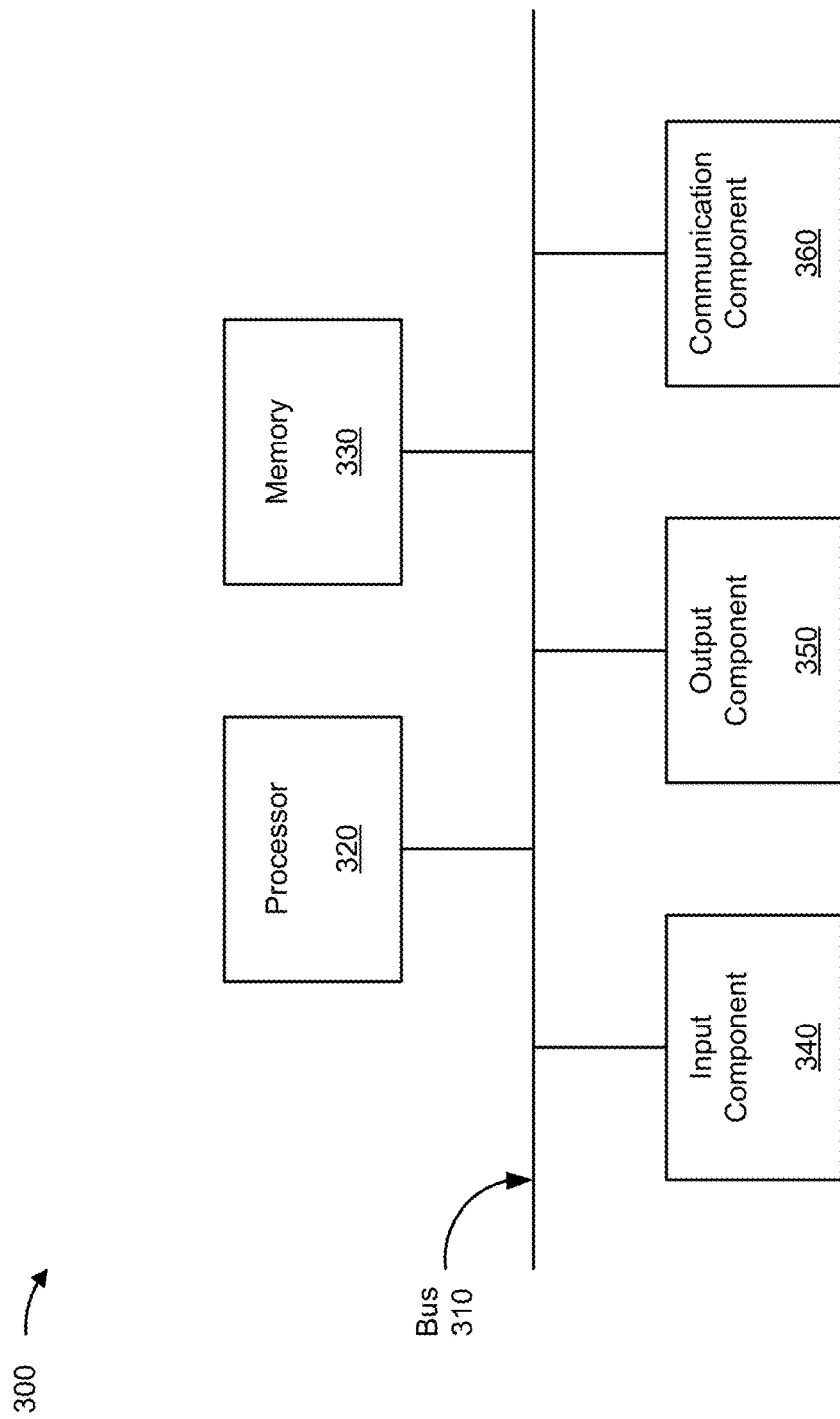
FIG. 3 is a diagram of example components of a device, which may correspond to the data processing system and/or the data structure.

FIG. 3 is a diagram of example components of a device 300, which may correspond to the data processing system 201, the data structure 230, and/or the client device 240. In some implementations, the data processing system 201, the data structure 230, and/or the client device 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
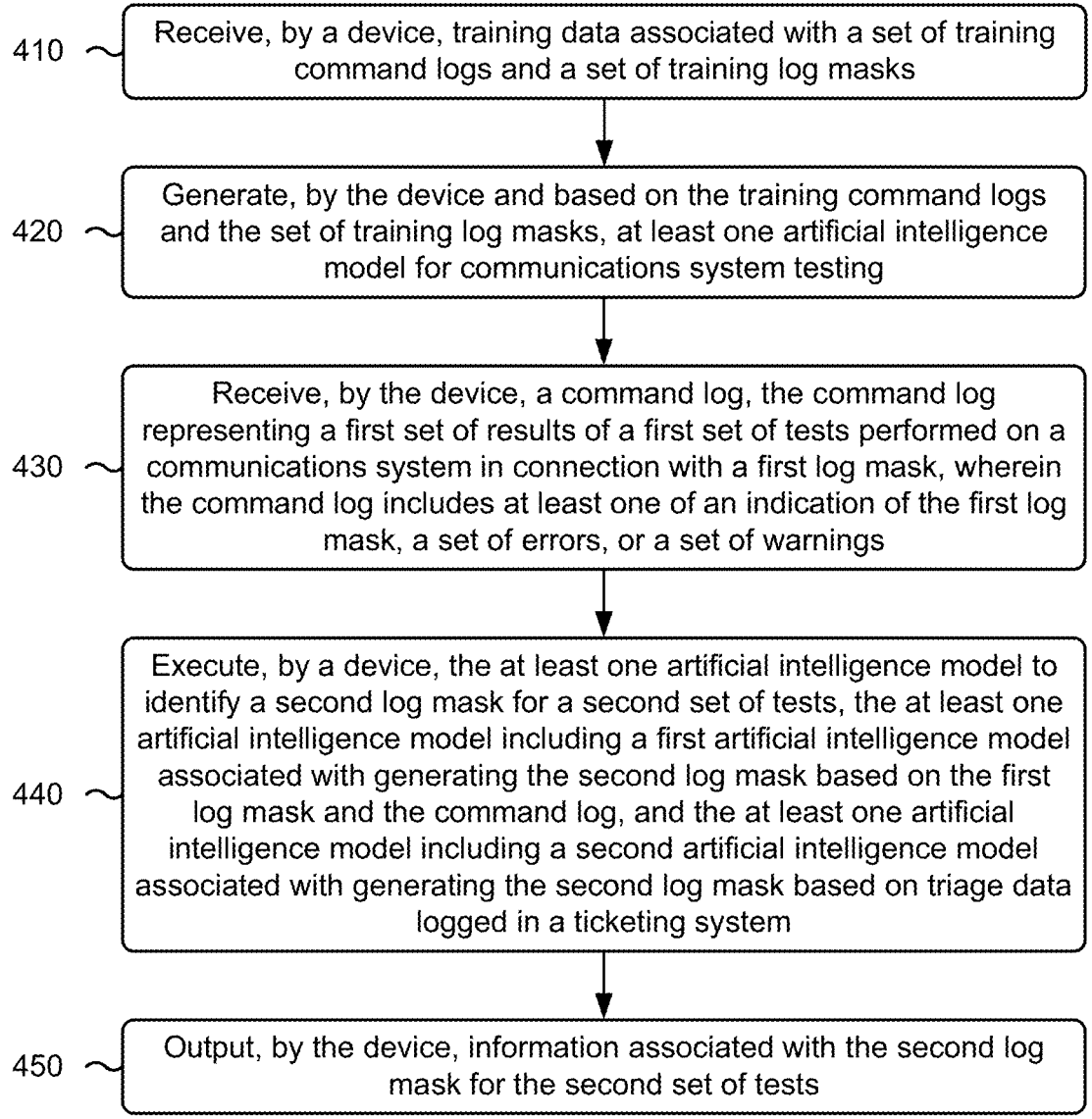
FIG. 4 is a flowchart of an example process associated with artificial intelligence based log mask prediction for communications system testing.

FIG. 4 is a flowchart of an example process 400 associated with artificial intelligence based log mask prediction for communications system testing. In some implementations, one or more process blocks of FIG. 4 are performed by a device (e.g., the data processing system 201). In some implementations, one or more process blocks of FIG. 4 are performed by another device or a group of devices separate from or including the device, such as a client device (e.g., the client device 240). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving training data associated with a set of training command logs and a set of training log masks (block 410). For example, the device may receive training data associated with a set of training command logs and a set of training log masks, as described above.

As further shown in FIG. 4, process 400 may include generating, based on the training command logs and the set of training log masks, at least one artificial intelligence model for communications system testing (block 420). For example, the device may generate, based on the training command logs and the set of training log masks, at least one artificial intelligence model for communications system testing, as described above.

As further shown in FIG. 4, process 400 may include receiving a command log, the command log representing a first set of results of a first set of tests performed on a communications system in connection with a first log mask, wherein the command log includes at least one of an indication of the first log mask, a set of errors, or a set of warnings (block 430). For example, the device may receive a command log, the command log representing a first set of results of a first set of tests performed on a communications system in connection with a first log mask, wherein the command log includes at least one of an indication of the first log mask, a set of errors, or a set of warnings, as described above. In some implementations, the command log includes at least one of an indication of the first log mask, a set of errors, or a set of warnings.

As further shown in FIG. 4, process 400 may include executing the at least one artificial intelligence model to identify a second log mask for a second set of tests, the at least one artificial intelligence model including a first artificial intelligence model associated with generating the second log mask based on the first log mask and the command log, and the at least one artificial intelligence model including a second artificial intelligence model associated with generating the second log mask based on triage data logged in a ticketing system (block 440). For example, the device may execute the at least one artificial intelligence model to identify a second log mask for a second set of tests, the at least one artificial intelligence model including a first artificial intelligence model associated with generating the second log mask based on the first log mask and the command log, and the at least one artificial intelligence model including a second artificial intelligence model associated with generating the second log mask based on triage data logged in a ticketing system, as described above.

As further shown in FIG. 4, process 400 may include outputting information associated with the second log mask for the second set of tests (block 450). For example, the device may output information associated with the second log mask for the second set of tests, as described above.

Process 400 may include additional implementations, such as any single implementation or any combination of implementations described below and/or in connection with one or more other processes described elsewhere herein.

In a first implementation, a log mask represents a configuration of a first subset of a set of possible test elements that are enabled and a second subset of the set of possible test elements that are disabled.

In a second implementation, alone or in combination with the first implementation, a log mask is a digit string representing a configuration for a set of possible test elements.

In a third implementation, alone or in combination with one or more of the first and second implementations, receiving the training data comprises extracting case data associated with a set of tickets in the ticketing system, searching the case data to extract the set of training command logs, and parsing the set of training command logs to extract the set of training log masks.

In a fourth implementation, alone or in combination with one or more of the first through third implementations, process 400 includes converting the set of training log masks to a set of training log bases, wherein a training log base, of the set of training log bases, is a digit string representing a corresponding log mask.

In a fifth implementation, alone or in combination with one or more of the first through fourth implementations, process 400 includes processing the training data to generate processed training data, wherein the processing of the training data includes concatenating a set of fields of the training data to generate a set of words, generating a dictionary for the training data based on the set of words, filtering the dictionary to generate a cleaned dictionary, and extracting data from the cleaned dictionary for generation of the at least one artificial intelligence model.

In a sixth implementation, alone or in combination with one or more of the first through fifth implementations, process 400 includes extracting, from the training data, training triage data associated with the set of training command logs and the set of training log masks, and generating the at least one artificial intelligence model comprises generating the at least one artificial intelligence model using the training triage data.

In a seventh implementation, alone or in combination with one or more of the first through sixth implementations, generating the at least one artificial intelligence model comprises passing a dataset object, a compute metrics function, and a set of training arguments to a constructed trainer object, wherein the dataset object is a representation of the training data, training a set of embeddings, using an embedding model, based on the dataset object, the compute metrics function, and the set of training arguments, encoding the embeddings using an encoder, wherein the encoder includes a plurality of model layers, activating the encoded embeddings using a pooler, and applying a dropout and a classifier to the activated, encoded embeddings.

In an eighth implementation, alone or in combination with one or more of the first through seventh implementations, generating the at least one artificial intelligence model comprises converting sentences or paragraphs of the training data to a dense tensor space, wherein sentence lengths or paragraph lengths of the sentences or paragraphs are based on a set of blocks of the set of training command logs and a statistical sentence length metric.

In a ninth implementation, alone or in combination with one or more of the first through eighth implementations, one or more outlier blocks are removed from the set of blocks to determine the statistical sentence length metric.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, coupled to the one or more memories, configured to:
receive training data associated with a set of training command logs and a set of training log masks;
generate, based on the training command logs and the set of training log masks, at least one artificial intelligence model for communications system testing;
receive a command log, the command log representing a first set of results of a first set of tests performed on a communications system in connection with a first log mask,
wherein the command log includes at least one of an indication of the first log mask, a set of errors, or a set of warnings;
execute the at least one artificial intelligence model to identify a second log mask for a second set of tests,
the at least one artificial intelligence model including a first artificial intelligence model associated with generating the second log mask based on the first log mask and the command log, and
the at least one artificial intelligence model including a second artificial intelligence model associated with generating the second log mask based on triage data logged in a ticketing system;
output information associated with the second log mask for the second set of tests;
receive, based on outputting the information associated with the second log mask, a second command log, the second command log representing a second set of results of the second set of tests performed on the communications system in connection with the second log mask; and
evaluate the second command log to determine whether to generate a third log mask.

2. The device of claim 1,
wherein a log mask represents a configuration of a first subset of a set of possible test elements that are enabled and a second subset of the set of possible test elements that are disabled.

3. The device of claim 1,
wherein a log mask is a digit string representing a configuration for a set of possible test elements.

4. The device of claim 1,
wherein the one or more processors, to receive the training data, are configured to:
extract case data associated with a set of tickets in the ticketing system;
search the case data to extract the set of training command logs; and
parse the set of training command logs to extract the set of training log masks.

5. The device of claim 1,
wherein the one or more processors are further configured to:
convert the set of training log masks to a set of training log bases, wherein a training log base, of the set of training log bases, is a digit string representing a corresponding log mask.

6. The device of claim 1,
wherein the one or more processors are further configured to:
process the training data to generate processed training data, wherein the processing of the training data includes concatenating a set of fields of the training data to generate a set of words, generating a dictionary for the training data based on the set of words, filtering the dictionary to generate a cleaned dictionary, and extracting data from the cleaned dictionary for generation of the at least one artificial intelligence model.

7. The device of claim 1,
wherein the one or more processors are further configured to:
extract, from the training data, training triage data associated with the set of training command logs and the set of training log masks, and
wherein the one or more processors, to generate the at least one artificial intelligence model, are configured to:
generate the at least one artificial intelligence model using the training triage data.

8. A method, comprising:
receiving, by a device, a command log, the command log representing a first set of results of a first set of tests performed on a communications system in connection with a first log mask,
wherein the command log includes at least one of an indication of the first log mask, a set of errors, or a set of warnings;
executing, by the device, a plurality of artificial intelligence models to identify a second log mask for a second set of tests,
the plurality of artificial intelligence models including a first artificial intelligence model associated with generating the second log mask based on the first log mask and the command log, and
the plurality of artificial intelligence models including a second artificial intelligence model associated with generating the second log mask based on triage data logged in a ticketing system;
outputting, by the device, information associated with the second log mask for the second set of tests;
receiving, based on outputting the information associated with the second log mask, a second command log, the second command log representing a second set of results of the second set of tests performed on the communications system in connection with the second log mask; and
evaluating the second command log to determine whether to generate a third log mask.

9. The method of claim 8,
wherein a log mask represents a configuration of a first subset of a set of possible test elements that are enabled and a second subset of the set of possible test elements that are disabled.

10. The method of claim 8,
wherein a log mask is a digit string representing a configuration for a set of possible test elements.

11. The method of claim 8,
wherein generating the plurality of artificial intelligence models comprises:
passing a dataset object, a compute metrics function, and a set of training arguments to a constructed trainer object, wherein the dataset object is a representation of training data;
training a set of embeddings, using an embedding model, based on the dataset object, the compute metrics function, and the set of training arguments;
encoding the embeddings using an encoder, wherein the encoder includes a plurality of model layers;
activating the encoded embeddings using a pooler; and
applying a dropout and a classifier to the activated, encoded embeddings.

12. The method of claim 11,
wherein each model layer of the plurality of model layers is an artificial intelligence model of the plurality of artificial intelligence models.

13. The method of claim 8,
wherein generating the plurality of artificial intelligence models comprises:
converting sentences or paragraphs of training data to a dense tensor space,
wherein sentence lengths or paragraph lengths of the sentences or paragraphs are based on a set of blocks of the set of training command logs and a statistical sentence length metric.

14. The method of claim 13,
wherein one or more outlier blocks are removed from the set of blocks to determine the statistical sentence length metric.

15. A non-transitory computer-readable medium storing a set of instructions, the set of instructions comprising:
one or more instructions that, when executed by one or more processors of a device, cause the device to:
receive a first command log, the first command log representing a first set of results of a first set of tests performed on a communications system in connection with a first log mask,
wherein the first command log includes at least one of an indication of the first log mask, a set of errors, or a set of warnings;
execute at least one artificial intelligence model to identify a second log mask for a second set of tests,
the at least one artificial intelligence model including a first artificial intelligence model associated with generating the second log mask based on the first log mask and the first command log, and
the at least one artificial intelligence model including a second artificial intelligence model associated with generating the second log mask based on triage data logged in a ticketing system; and
output information associated with the second log mask for the second set of tests;
receive, based on outputting the information associated with the second log mask, a second command log, the second command log representing a second set of results of the second set of tests performed on the communications system in connection with the second log mask; and
evaluate the second command log to determine whether to generate a third log mask.

16. The non-transitory computer-readable medium of claim 15,
wherein the one or more instructions further cause the device to:
generate the third log mask using the at least one artificial intelligence model; and
output information associated with the third log mask for a third set of tests.

17. The non-transitory computer-readable medium of claim 15,
wherein the one or more instructions further cause the device to:
update the at least one artificial intelligence model based on the second command log.

18. The non-transitory computer-readable medium of claim 15,
wherein a log mask represents a configuration of a first subset of a set of possible test elements that are enabled and a second subset of the set of possible test elements that are disabled.

19. The non-transitory computer-readable medium of claim 15, wherein a log mask is a digit string representing a configuration for a set of possible test elements.

20. The non-transitory computer-readable medium of claim 15,
wherein the one or more instructions, that cause the device to generate the at least one artificial intelligence model, cause the device to:
convert sentences or paragraphs of training data to a dense tensor space,
wherein sentence lengths or paragraph lengths of the sentences or paragraphs are based on a set of blocks of the set of training command logs and a statistical sentence length metric.

* * * * *